(12) United States Patent
Nelson et al.

(10) Patent No.: US 6,841,292 B2
(45) Date of Patent: Jan. 11, 2005

(54) HYDROGEN SENSOR FOR FUEL PROCESSORS OF A FUEL CELL

(75) Inventors: Patricia J. Nelson, Rochester, NY (US); Manish Sinha, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/845,881

(22) Filed: May 14, 2004

(65) Prior Publication Data

US 2004/0209132 A1 Oct. 21, 2004

Related U.S. Application Data

(62) Division of application No. 09/946,377, filed on Sep. 4, 2001, now Pat. No. 6,770,391.

(51) Int. Cl.⁷ .............................................. H01M 10/48
(52) U.S. Cl. ........................ 429/90; 205/335; 205/343; 205/787.5; 204/424; 204/433
(58) Field of Search ........................... 429/90; 205/335, 205/343, 787.5; 204/424, 433

(56) References Cited

U.S. PATENT DOCUMENTS

| | | | |
|---|---|---|---|
| 4,020,830 A | 5/1977 | Johnson et al. | |
| 4,315,753 A | 2/1982 | Bruckenstein et al. | |
| 4,397,714 A | 8/1983 | Janata et al. | |
| 4,437,969 A | 3/1984 | Covington et al. | |
| 4,976,991 A | 12/1990 | Ammende et al. | |
| 5,279,169 A | 1/1994 | Freeman | |
| 5,472,580 A | 12/1995 | Kennard, III et al. | |
| 5,804,462 A | 9/1998 | Liu et al. | |
| 5,811,812 A | 9/1998 | Williams et al. | |
| 6,001,499 A | 12/1999 | Grot et al. | |
| 6,082,177 A | 7/2000 | Niazy et al. | |
| 6,451,464 B1 * | 9/2002 | Edlund et al. | 429/19 |
| 6,458,478 B1 * | 10/2002 | Wang et al. | 429/17 |
| 6,497,970 B1 | 12/2002 | Fronk | 429/12 |
| 6,528,191 B1 * | 3/2003 | Senner | 429/12 |
| 6,663,990 B2 * | 12/2003 | Iio et al. | 429/22 |

* cited by examiner

*Primary Examiner*—Bruce F. Bell
(74) *Attorney, Agent, or Firm*—Cary W. Brooks, Esq.; Linda M. Deschere, Esq.

(57) ABSTRACT

A method and apparatus estimate hydrogen concentration in a reformate stream produced by a fuel processor of a fuel cell. A sensor measures carbon monoxide, carbon dioxide, and water in the reformate stream. A fuel meter controls fuel input to the fuel processor. An air meter controls air input to the fuel processor. A water meter controls water input to the fuel processor. A transport delay estimator recursively estimates transport delay of the fuel processor. A hydrogen estimator associated with the transport delay estimator, the air, water and fuel meters, and the sensor estimates hydrogen concentration in the reformate stream. The hydrogen estimator includes a fuel processor model that is adjusted using the estimated transport delay. The carbon monoxide, the carbon dioxide and the water are measured using a nondispersive infrared (NDIR) sensor.

12 Claims, 4 Drawing Sheets

HYDROGEN SENSOR FOR FUEL PROCESSORS OF A FUEL CELL

CROSS REFERENCE TO CO-PENDING APPLICATION

This application is a divisional of U.S. patent application Ser. No. 09/946,377, filed Sep. 4, 2001, now U.S. Pat. No. 6,770,391. The disclosure of the above application is incorporated herein by reference.

FIELD OF THE INVENTION

The present invention relates to fuel cells, and more particularly to a hydrogen sensor for a fuel processor of a fuel cell.

BACKGROUND OF THE INVENTION

Fuel cells are increasingly being used as a power source in a wide variety of different applications. Fuel cells have also been proposed for use in electrical vehicle power plants to replace internal combustion engines. A solid-polymer-electrolyte membrane (PEM) fuel cell includes a membrane that is sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across the electrodes. In a second half-cell reaction, oxygen ($O_2$) at the cathode reacts with protons ($H^+$), and electrons ($e^-$) are taken up to form water ($H_2O$).

The main function of a fuel processor in the fuel cell system is to provide a continuous stream of hydrogen to the fuel cell stack that converts the chemical energy in the hydrogen fuel to electrical power. The fuel processor produces a reformate stream that is composed primarily of hydrogen, carbon dioxide, nitrogen, water, methane and trace amounts of carbon monoxide. During operation, the fuel cell stack demands a certain flow rate of hydrogen from the fuel processor to meet the vehicle's demand for power. The performance of the fuel processor is characterized by the flow rate of hydrogen in the reformate stream. The control of the fuel processor to maintain or track a desired flow rate of hydrogen by the fuel cell stack requires a feedback signal that measures the hydrogen flow rate. The feedback signal is used in a control algorithm to take corrective action.

Currently, there is no hydrogen sensor technology that can measure the hydrogen concentration in the reformate stream that is suitable for use in fuel cell applications. For example, existing hydrogen sensors, such as those formed from a thin film of palladium, cannot be used in the presence of water droplets that are present in the reformate stream. Therefore, the thin film palladium sensors require a water filter that slows the response time. Furthermore, oxide-based sensors such as $ZrO_2$ and $SnO_2$ need to operate in an oxidizing environment. The reformate, on the other hand, is a reducing environment that lacks oxygen. Thermal conductance sensors have also been proposed. However, these sensors cannot withstand the flowrates that are encountered in a fuel cell (typically 20 g/s of flow). Proton exchange membrane (PEM) and metal hydride sensors have also been proposed but none are currently commercially available.

SUMMARY OF THE INVENTION

A hydrogen sensor according to the present invention estimates the hydrogen concentration in a reformate stream produced by a fuel processor of a fuel cell. A sensor measures the concentration of carbon monoxide, carbon dioxide, and water vapor in the reformate stream. A fuel meter measures and controls fuel input to the fuel processor. An air meter measures and controls air input to the fuel processor. A water meter measures and controls water input to the fuel processor. A transport delay estimator connected to the sensor recursively estimates transport delay of the fuel processor. A hydrogen estimator connected to the transport delay estimator, the air, water and fuel meters, and the sensor estimates the hydrogen concentration in the reformate stream.

In other features of the invention, the hydrogen estimator includes a fuel processor model that is adjusted using the estimated transport delay. The concentration of carbon monoxide, carbon dioxide and water in the reformate stream are preferably sensed using a nondispersive infrared (NDIR) sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
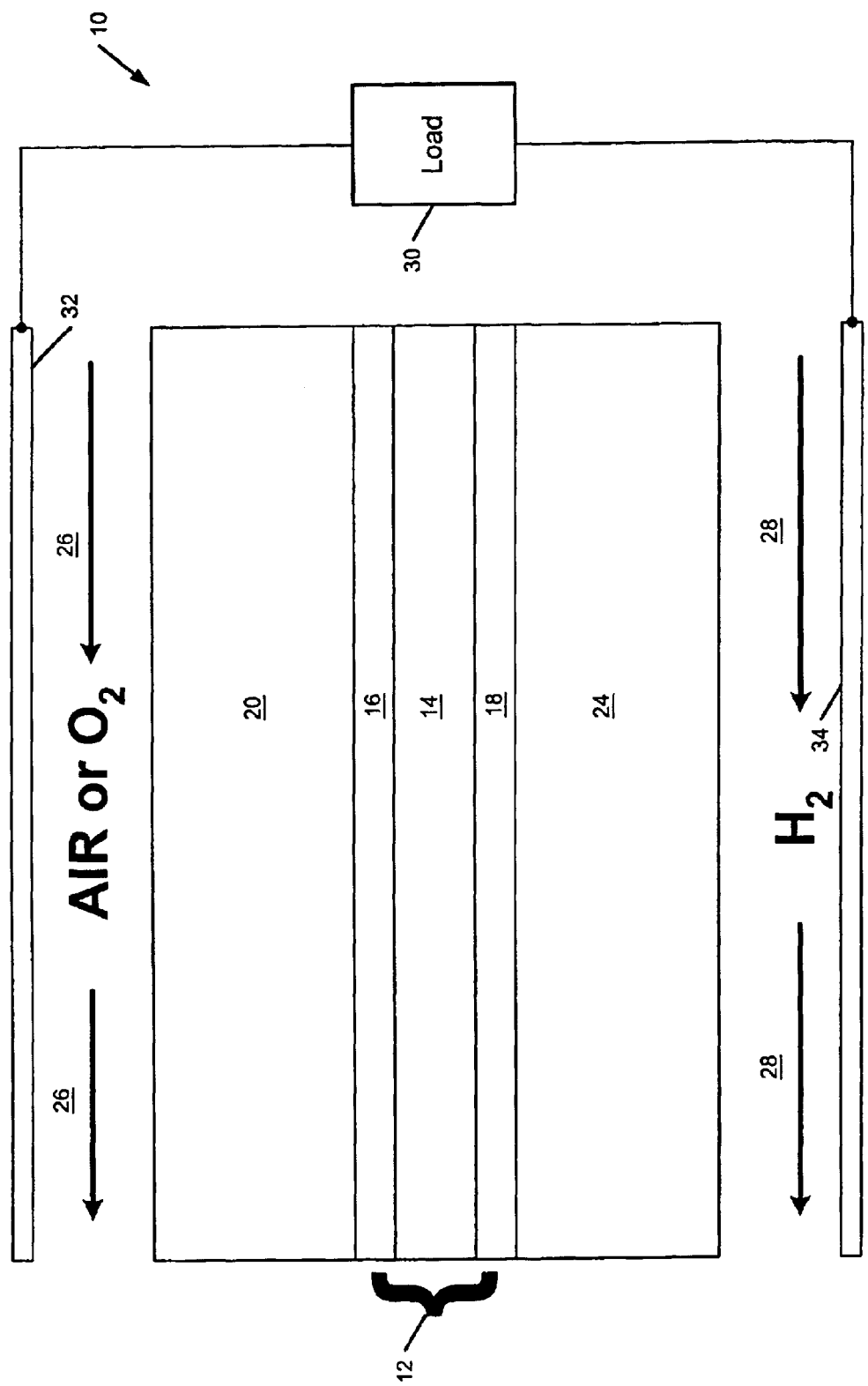
FIG. 1 illustrates a cross-section of a membrane electrode assembly (MEA) of a fuel cell assembly.

Referring now to FIG. 1, a cross-section of a fuel cell assembly 10 that includes a membrane electrode assembly (MEA) 12 is shown. Preferably, the MEA 12 is a proton exchange membrane (PEM). The MEA 12 includes a membrane 14, a cathode 16, and an anode 18. The membrane 14 is sandwiched between the cathode 16 and the anode 18.

A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs oxygen or air ($O_2$) from a source to the cathode diffusion medium 20. The anode flow channel 28 receives and directs hydrogen ($H_2$) from a source to the anode diffusion medium 24.

In the fuel cell assembly 10, the membrane 14 is a cation permeable, proton conductive membrane having $H^+$ ions as the mobile ion. The fuel gas is hydrogen ($H_2$) and the oxidant is oxygen or air ($O_2$). The overall cell reaction is the oxidation of hydrogen to water and the respective reactions at the anode 18 and the cathode 16 are as follows:

$$H_2 = 2H^+ + 2e^-$$

$$0.5\ O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across a first plate 32 and a second plate 34 of the MEA 12 to receive the electricity. The plates 32 and/or 34 are bipolar plates if a fuel cell is adjacent to the respective plate 32 or 34 or end plates if a fuel cell is not adjacent thereto.

Figure 2:
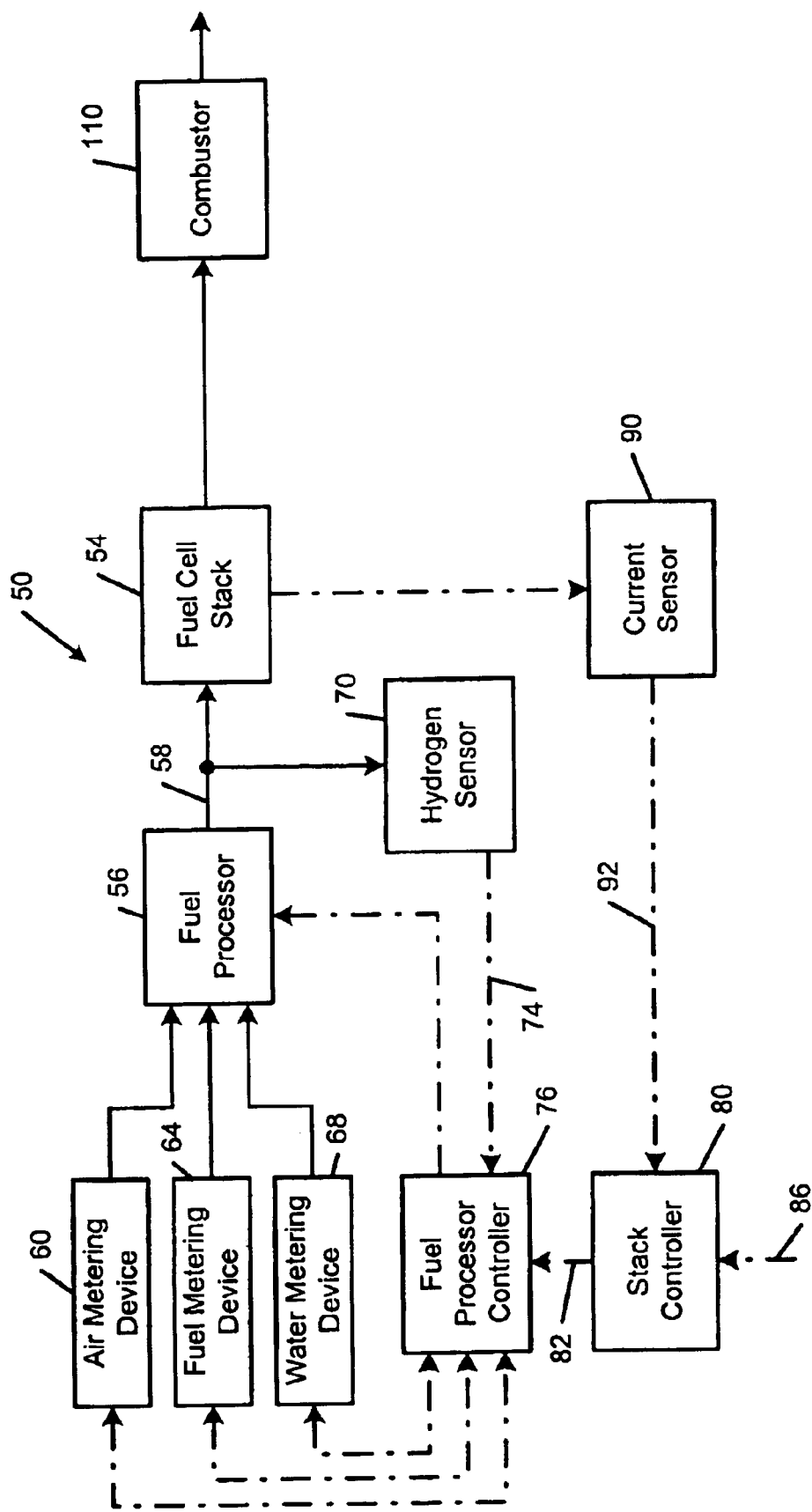
FIG. 2 is a schematic block diagram of a control system for a fuel cell.

Referring now to FIG. 2, a control system 50 for a fuel cell stack 54 is illustrated. A fuel processor 56 generates a reformate stream 58 that is input to the anode flow channel 28 of the fuel cell stack 54. An air metering device 60 varies the input of air to the fuel processor 56. A fuel metering device 64 varies the input of fuel such as methanol to the fuel processor 56. A water metering device 68 varies the input of water to the fuel processor 56.

A hydrogen sensor 70 senses the hydrogen concentration of the reformate stream 58 and provides a hydrogen feedback signal 74 to a fuel processor controller 76. The fuel processor controller 76 sends control signals to the air metering device 60, the fuel metering device 64, and the water metering device 68. A stack controller 80 provides a hydrogen setpoint signal 82 to the fuel processor controller 76. A current setpoint 86 is input to the stack controller 80. A current sensor 90 senses the current that is output by the fuel cell stack 54 and provides a current feedback signal 92 to the stack controller 80.

In use, the air, the fuel and the water are supplied to the fuel processor 56. The fuel processor 56 produces the reformate stream 58. The hydrogen sensor 70 senses the hydrogen concentration of the reformate stream 58 and provides the hydrogen feedback signal 74 to the fuel processor controller 76. The fuel cell stack 54 produces electricity from the hydrogen in the reformate stream 58. The current sensor 90 senses the current output by the fuel cell stack 54 and generates the current feedback signal 92 that is input to the stack controller 80. The stack controller 80 compares the current feedback signal 92 to the current setpoint signal 86. The stack controller 80 generates the hydrogen setpoint signal 82 that is output to the fuel processor controller 76.

Figure 3:
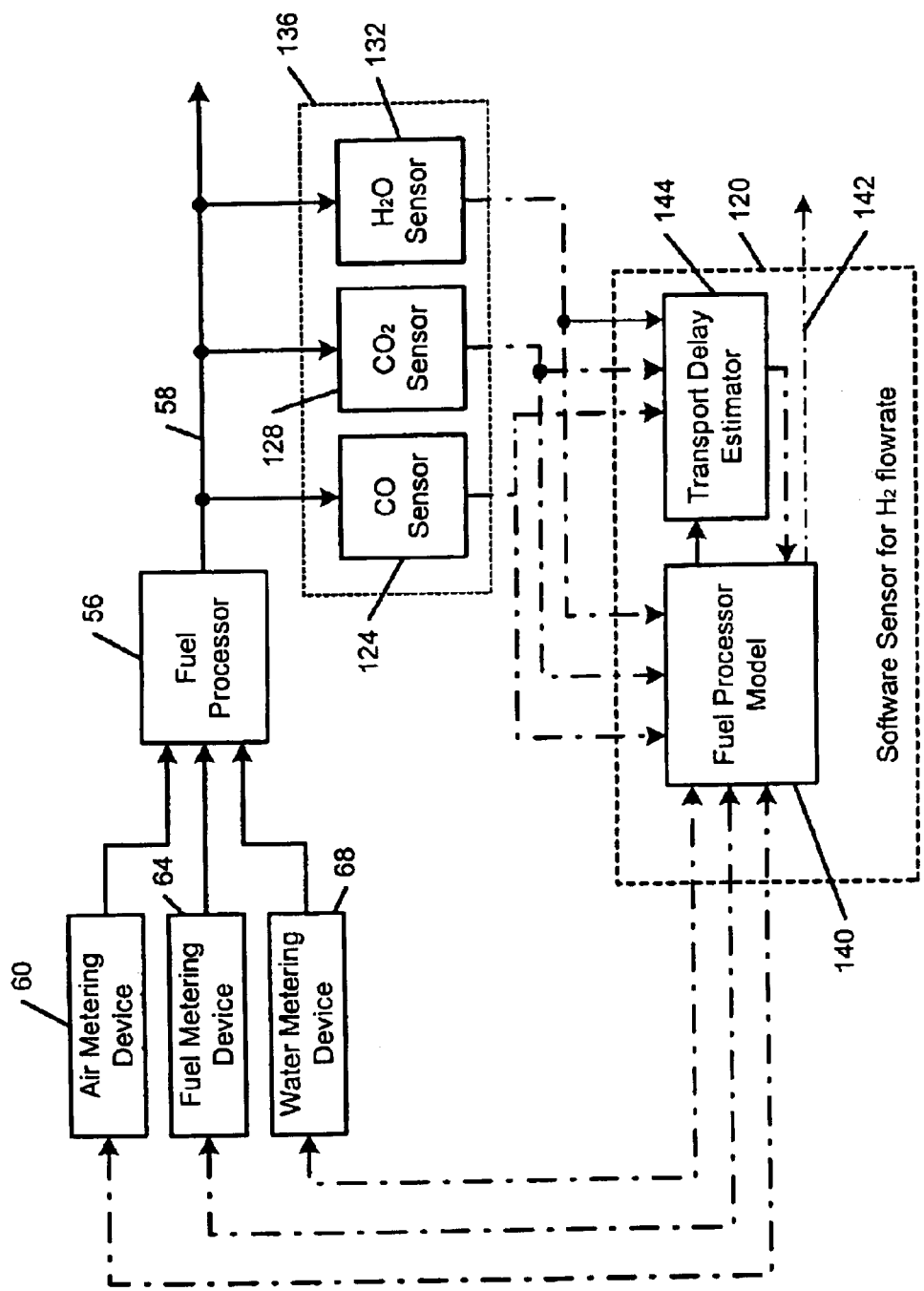
FIG. 3 is a schematic block diagram illustrating a hydrogen sensor for a fuel cell.

Commercially available hydrogen sensors 70 have been found to be unsuitable for use in fuel cells used in electric vehicles. FIG. 3 illustrates a hydrogen sensor 120 according to the present invention that indirectly measures hydrogen concentration from other components of the reformate stream. A carbon monoxide sensor 124 senses the concentration of carbon monoxide in the reformate stream 58. A carbon dioxide sensor 128 senses the concentration of carbon dioxide in the reformate stream 58. A water sensor 132 senses the concentration of water in the reformate stream 58. In preferred embodiment, the sensors 124, 128 and 132 are a nondispersive infrared (NDIR) sensor 136 available from Ion Optics, Inc. The NDIR sensor 136 detects the concentrations of carbon monoxide, carbon dioxide and water in fluctuating pressure, temperature and flowrate conditions.

Outputs from the sensors 124, 128 and 132 are input to a fuel processor model 140 that forms part of the hydrogen sensor 120. The fuel processor model 140 models the operation of the fuel processor 56 as will be described more fully below and provides a hydrogen feedback signal 142 to the fuel processor controller 76. Outputs from the air metering device 60, the fuel metering device 64, and the water metering device 68 are input to the fuel processor model 140. Outputs from the sensors 124, 128 and 132 are also input to a time delay estimator 144. The time delay estimator 144 determines the time required for materials to pass through the fuel processor 56.

A basic feature of the fuel processor model 140 is to represent the fuel processor 56 as a black box in which the following overall chemical reaction occurs:

$$aC_8H_{18} + bO_2 + cH_2O + kN_2 \rightarrow dH_2 + eCO + fCO_2 + gH_2O + hCH_4 + kN_2$$

The coefficients such as a, b, and c, are the molar flow rates into the fuel processor 56 at any given time. Coefficients a, b, and c are estimated from the air, fuel and water metering devices 60, 64 and 68 that are input to the fuel processor 56. The sensors 124, 128 and 132 or the combined NDIR sensor 136 provide the concentration of carbon monoxide, carbon dioxide, and water in the reformate stream 58. The fuel processor model 140 and the transport delay estimator 144 assume elemental balancing of carbon, hydrogen and oxygen. The fuel processor model 140 and the transport delay estimator 144 also assume overall mass balancing to estimate the transport delay in fuel processor 56 using the transport delay estimator 144. If not, then some of the model parameters are adjusted or optimized to drive the transport delay to a small value.

The transport delay is defined as the time that the elements remain in fuel processor 56. The transport delay is a lumped parameter that is adjusted to satisfy the elemental and mass balances. The resulting information is used to estimate the concentration of hydrogen. The fuel processor model 140 may also be used to predict methane concentration in the reformate stream 58.

There are several underlying assumptions that are made by the fuel processor model 140 in modeling the fuel processor 56. The fuel processor model 140 assumes that there is no hydrocarbon slip except methane and that there is no oxygen slip. The fuel processor model 140 assumes that the fuel processor 56 is a train of plug flow reactors. The fuel processor model 140 assumes that there is mass balance. In other words, the fuel processor 56 cannot create or destroy mass. The fuel processor model 140 assumes elemental balance. In other words, the fuel processor 56 cannot create or destroy elements. Finally, the fuel processor model 140 assumes that the fuel processor 56 has a variable lag.

Figure 4:
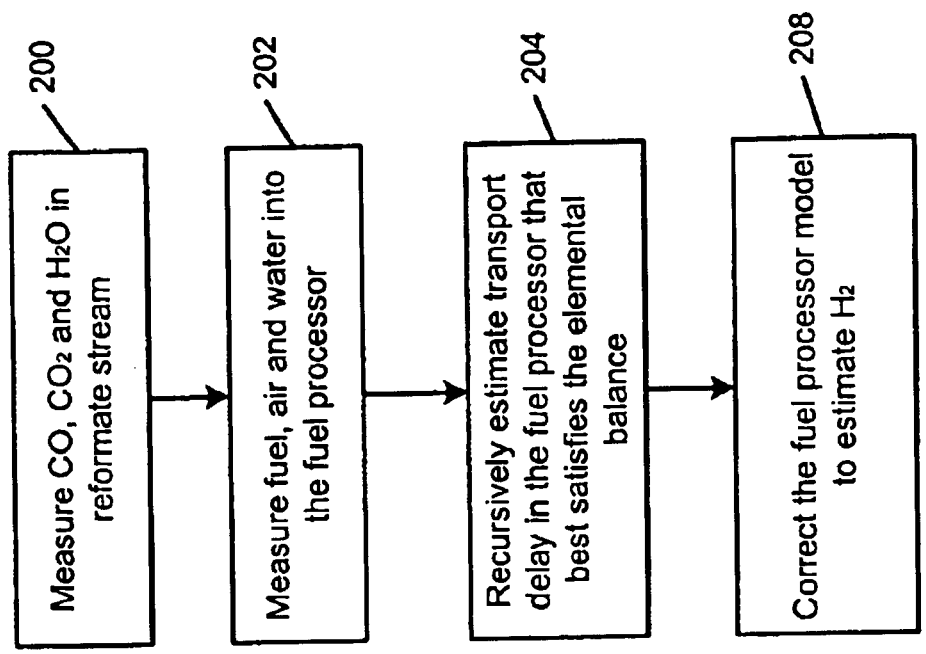
FIG. 4 illustrates steps for determining hydrogen concentration using the hydrogen sensor of FIG. 3.

Referring now to FIG. 4, steps for estimating hydrogen concentration in the reformate stream 58 are illustrated. In step 200, carbon monoxide, carbon dioxide and water are measured in the reformate stream 58. In step 202, flowmeters measure the fuel, the air and the water supplied to the fuel processor 56. In step 204, the transport delay is recursively estimated to best satisfy elemental and mass balancing. In step 208, the fuel processor model 140 is corrected and the hydrogen concentration is estimated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of estimating hydrogen concentration of a reformate stream produced by a fuel processor of a fuel cell, comprising the steps of:
   measuring carbon monoxide, carbon dioxide, and water in said reformate stream produced by said fuel processor;
   measuring fuel, air and water that is input to said fuel processor;
   estimating hydrogen concentration using said air, fuel and water inputs and said carbon monoxide, said carbon dioxide, and said water in said reformate stream.

2. The method of claim 1 further comprising the steps of:
   estimating a transport delay of said fuel processor; and
   adjusting a fuel processor model using said estimated transport delay.

3. The method of claim 2 wherein said transport delay is estimated recursively.

4. The method of claim 8 wherein said carbon monoxide, said carbon dioxide and said water are measured using a nondispersive infrared (NDIR) sensor.

5. The method of claim 1 wherein said step of estimating hydrogen concentration assumes elemental balance.

6. The method of claim 1 wherein said step of estimating hydrogen concentration assumes mass balance.

7. A system for estimating hydrogen concentration in a reformate stream produced by a fuel processor of a fuel cell, comprising:
   a sensor for measuring carbon monoxide, carbon dioxide, and water in said reformate stream;
   a fuel meter that meters fuel input to said fuel processor;
   an air meter that meters air input to said fuel processor;
   a water meter that meters water input to said fuel processor; and
   a hydrogen estimator connected to said air meter, water meter said fuel meter, and said sensor that estimates hydrogen concentration in said reformate stream.

8. The system of claim 7 wherein said hydrogen estimator estimates transport delay and includes a fuel processor model that is adjusted using said estimated transport delay.

9. The system of claim 8 wherein said transport delay is estimated recursively.

10. The system of claim 7 wherein said carbon monoxide, said carbon dioxide and said water are measured using a nondispersive infrared (NDIR) sensor.

11. The system of claim 8 wherein said fuel processor model of said hydrogen estimator assumes elemental balance.

12. The system of claim 8 wherein said fuel processor model of said hydrogen estimator assumes mass balance.

* * * * *